(12) United States Patent
Lauffenburger et al.

(10) Patent No.: US 6,621,824 B1
(45) Date of Patent: Sep. 16, 2003

(54) DATA TRANSMISSION SYSTEM AND METHOD OF OPERATION

(75) Inventors: Kenneth A. Lauffenburger, Carrollton, TX (US); Al Whaley, Palo Alto, CA (US); Klaus S. Fosmark, Plano, TX (US); William A. Perry, Jr., Addison, TX (US); Charles F. Shelor, Arlington, TX (US)

(73) Assignee: Efficient Networks, Inc., Dallas, TX (US)

( * ) Notice: Subject to any disclaimer, the term of this patent is extended or adjusted under 35 U.S.C. 154(b) by 0 days.

(21) Appl. No.: 09/251,107

(22) Filed: Feb. 16, 1999

(51) Int. Cl.[7] .................. H04L 12/28; H04L 12/56; G06F 3/00; G06F 3/02; G06F 3/023; G06F 3/05; G06F 3/06; G06F 5/00
(52) U.S. Cl. .................. 370/412; 370/395.4; 710/52
(58) Field of Search .................. 370/230, 230.1, 370/235, 235.1, 351, 389, 395.1, 395.4–395.43, 412–418; 710/52, 56, 22

(56) References Cited

U.S. PATENT DOCUMENTS

| 5,732,087 A | * | 3/1998 | Lauer et al. ............ 370/416 |
| 5,787,086 A | * | 7/1998 | McClure et al. ........ 370/413 |
| 5,870,628 A | * | 2/1999 | Chen et al. ............. 370/235 |

* cited by examiner

Primary Examiner—Seema S. Rao
Assistant Examiner—Kevin C. Harper
(74) Attorney, Agent, or Firm—Baker Botts L.L.P.

(57) ABSTRACT

A data transmission system includes a memory, a remote coupled to the memory by a receive data controller, and a host coupled to the memory by a transmit data controller. The system prioritizes the transmission of data cells from the remote to the host based on demand by dynamically allocating portions of the memory to data cells sharing a common and frequently recurring address at the host, and transmitting to the host incihvidual data cells together in a burst.

29 Claims, 3 Drawing Sheets

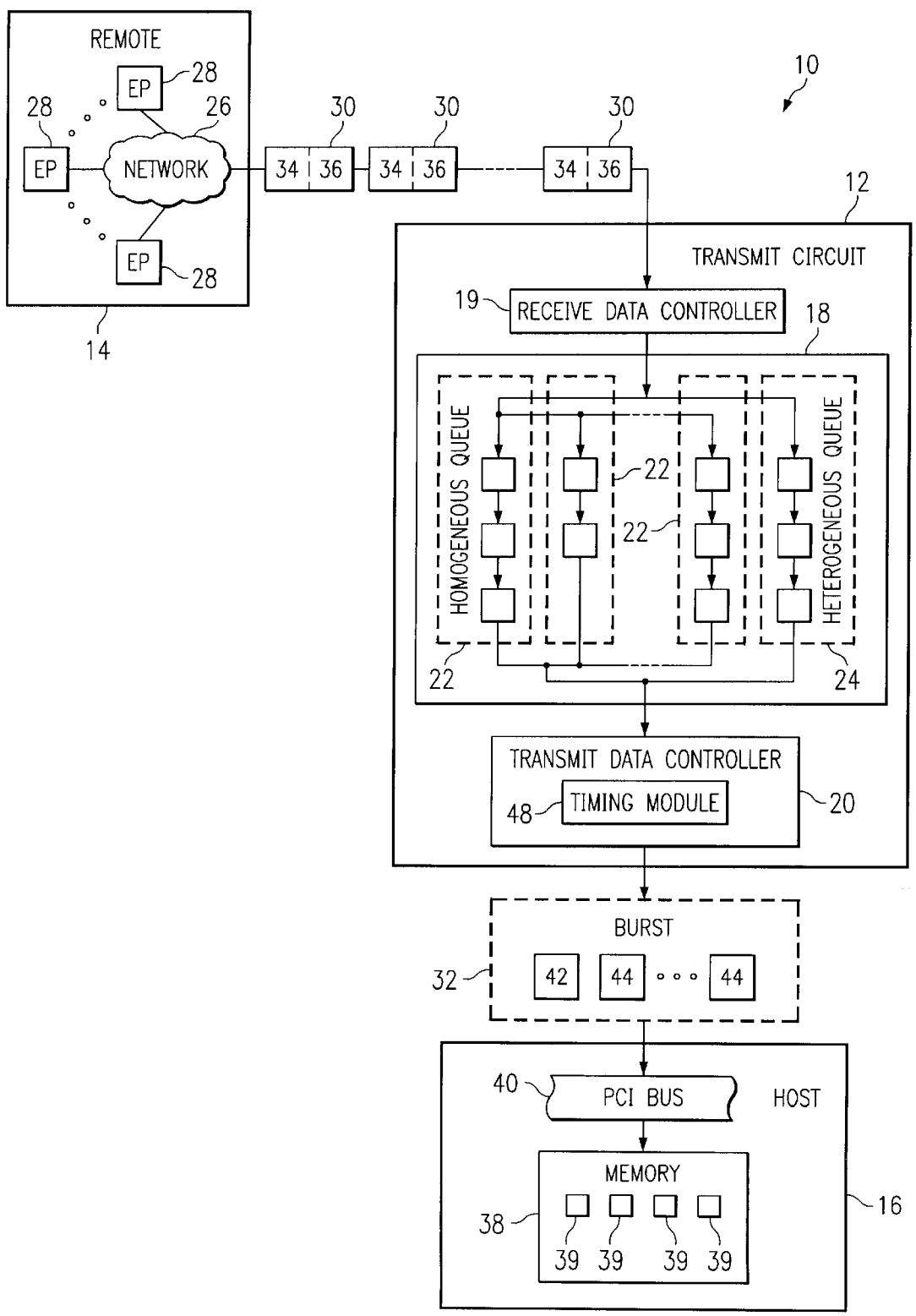

DATA TRANSMISSION SYSTEM AND METHOD OF OPERATION

CROSS-REFERENCE TO RELATED APPLICATIONS

This application is related to pending U.S. patent application Ser. No. 09/251,105, entitled "System and Method for Traffic Shaping Packet-Based Signals," and pending U.S. patent application Ser. No. 09/251,110, entitled "System and Method for Prefetching Data;" both applications filed concurrently with this application.

TECHNICAL FIELD OF THE INVENTION

The present invention relates to the field of data communications and processing, and more particularly to a data transmission system and method of operation.

BACKGROUND OF THE INVENTION

Data transmission over a network using an Asynchronous Transfer Mode (ATM) protocol involves transmitting individual data cells that have an information field and a header field. The header field includes a virtual path identifier (VPI) and a virtual channel identifier (VCI) that, together, define a virtual channel connection (VCC) between two ATM endpoints. Data cells destined for the same virtual channel address (VCA) may exhibit an irregular recurrence pattern of transmission, as cells are transmitted according to their actual demand. As a result, data cells transmitted from a network interface to an ATM endpoint across an interface bus are often individually transmitted. This involves transmitting overhead associated with each data cell across the bus, resulting in an inefficient data transmission. Furthermore, the interface bus allocates bandwidth over which the data cells are transmitted based upon availability, so that if it is not used it is lost. Transmitting individual data cells fails to optimize the use of allocated bandwidth resulting in an inefficient data transmission across the interface bus.

SUMMARY OF THE INVENTION

In accordance with the present invention, a data transmission system and method of operation is provided which substantially eliminates or reduces disadvantages and problems associated with previous data transmission systems.

In accordance with one embodiment of the present invention, a system for transmitting a plurality of data cells from a remote to a host includes a number of homogeneous queues that store data cells having a same virtual channel address, and a heterogeneous queue that stores at least two data cells having different virtual channel addresses. A controller coupled to the queues and to the remote stores a particular data cell in a selected one of the queues in response to a particular virtual channel address of the data cell.

Another embodiment of the present invention is a method for transmitting a plurality of data cells from a remote to a host that includes storing a particular data cell having a particular virtual channel address in a selected homogeneous queue if the homogeneous queue stores a data cell having the particular virtual channel address. The method continues by storing the particular data cell having the particular virtual channel address in a selected homogeneous queue if the homogeneous queue stores no data cells and no other homogeneous queue stores a data cell having the particular virtual channel address. The method also includes storing the particular data cell having the particular virtual channel address in a heterogeneous queue if each of the homogeneous queues stores at least one data cell having a virtual channel address different from the particular virtual channel address.

Technical advantages of the present invention relate to a data transmission system having the ability to efficiently and economically transfer ATM data cells from an ATM network to an ATM endpoint. The data transmission system may be formed on an application specific integrated circuit (ASIC) that may be advantageously implemented on a network interface card associated with a particular ATM endpoint, or on any communication device associated with the ATM network, such as, for example, a router, a bridge, a gateway, or a switch.

More particular technical advantages include a data transmission system that prioritizes the transmission of ATM data cells from an ATM network to an ATM endpoint based on demand by dynamically allocating portions of memory associated with the ATM endpoint to queue data cells sharing a common and frequently recurring VCA at the ATM endpoint. Specifically, the system stores data cells in either homogeneous or heterogeneous queues of memory based upon the VCA associated with each data cell and the content and capacity of each queue. Simultaneously, the system alternates the transmission of data cells between the heterogeneous queue and a selected homogeneous queue.

This technique of dynamically allocating memory and alternately dequeuing data cells from the queues allows the system to prioritize the transmission of data cells associated with the most frequently recurring VCAs over the transmission of data cells associated with the least frequently recurring VCAs. Furthermore, the technique allows the system to transmit the data cells across an interface bus associated with the ATM endpoint in a burst rather than individually, and without requiring a significant allocation of memory to support the vast number of potential VCAs at the particular ATM endpoint. Transmitting data cells across the interface bus in a burst rather than individually reduces the amount of transmitted overhead information and optimizes the use of allocated bandwidth for the interface bus, resulting in a faster, more efficient transmission of data cells from the ATM network to the ATM endpoint.

Other technical advantages of the data transmission system include triggering the transmission of the queued data cells after a programmable time delay to accumulate data cells associated with any particular VCA in the homogeneous and heterogeneous queues for a pre-determined amount of time relating to the programmable time delay. Accumulating the data cells in the queues maximizes the use of allocated bandwidth on the bus by approaching the maximum number of data cells that may be transmitted in a burst.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIG. 1 illustrates a block diagram of a data transmission system in accordance with the present invention;

DETAILED DESCRIPTION OF THE INVENTION

Figure 2A:
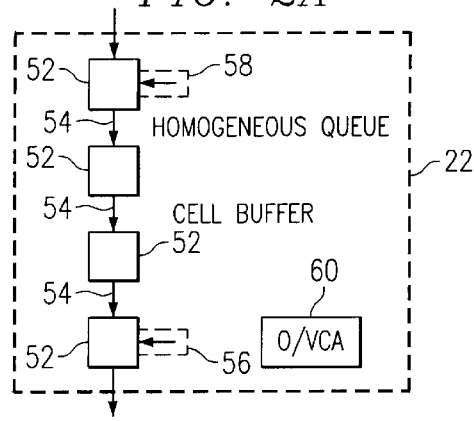
FIG. 2A illustrates one embodiment of a homogeneous queue of the system.

FIG. 1 illustrates a data transmission system 10 that includes a remote 14 coupled to a host 16 by a transmit circuit 12. In general, system 10 prioritizes the transmission of data cells 30 from remote 14 to host 16 based on demand by dynamically allocating portions of a memory 18 of transmit circuit 12 to data cells 30 sharing a common and frequently recurring address of a data structure 39 at host 16, and by transmitting to host 16 information stored in data cells 30 in a burst 32.

Transmit circuit 12 comprises memory 18 coupled to a receive data controller 19 and a transmit data controller 20. In one embodiment, transmit circuit 12 including memory 18, controller 19, and controller 20 may comprise a part of an application specific integrated circuit (ASIC) that provides ATM services to host 16. In another embodiment, controllers 19 and 20 alone comprise the ASIC, and interface with memory 18 that is external to the ASIC. The ASIC may be implemented on a network interface card associated with a particular host 16, or on any communication device associated with remote 14, such as, for example, a router, a bridge, a gateway, or a switch.

Memory 18 may comprise any suitable organization of volatile memory, such as, for example, RAM, SRAM, DRAM, or SDRAM that includes any appropriate number of files, stacks, queues, or any other suitable data structures. In one embodiment, memory 18 includes eight homogeneous queues 22 and a single heterogeneous queue 24. It should be understood that while data transmission system 10 is illustrated comprising eight homogeneous queues 22 and a single heterogeneous queue 24, this is solely for purposes of teaching the present invention and should not be construed to limit the teachings of the present invention to this or any particular number of queues 22 and 24. At any given time, each homogeneous queue 22 stores data cells 30 sharing a common address for a data structure 39 at host 16. Heterogenous queue 24 stores a mixture of data cells 30 for transmission to data structures 39 having different addresses at host 16.

Remote 14 may comprise a network 26 supporting a number of network endpoints 28. Network 26 comprises any combination or number of hubs, routers, bridges, gateways, switches, or any other association of suitable communication devices and related software that transmits packet-based or cell-based data between endpoints 28, such as, for example, from endpoint 28 to host 16. In one embodiment, network 26 comprises an ATM network implemented independently or in connection with a wide area network (WAN) or a local area network (LAN), such as an Ethernet network, a token ring network, or a fiber distributed data interface (FDDI) network. Network 26 supports higher level connectionless protocols such as Internet Protocol (IP) higher level connection-oriented protocol.s siiCh as Eramre Relay, or any other suitable networking protocol, by mapping the protocol data stream into an ATM protocol backbone or into any other suitable cell-based protocol. In this way, network 26 supports voice, data, and video signal transmissions. Endpoints 28 may comprise ATM endpoints, memory endpoints, or peripheral components.

Each data cell 30 includes a header field 34 and an information field 36. In one embodiment, each data cell 30 comprises an ATM data cell of a fixed length, such as, for example, fifty-three bytes, of which header field 34 comprises five bytes and information field 36 comprises forty-eight bytes. Data cells 30 of a fixed length may be switched by hardware and maintain lower processing overhead than data cells of a variable length, resulting in a faster transmission time from remote 14 to host 16.

Header field 34 includes a two-part connection identifier used by ATM protocols to route data cells 30 between endpoints 28. In particular, header field 34 includes a virtual path identifier (VPI) representing a group of virtual circuits that define a particular transmission route between ATM switches. Header field 34 also includes a virtual channel identifier (VCI) that is used locally at an endpoint 28 to denote a unique connection within a virtual path, such as, for example, a connection to a VCA of host 16. Multiple VCAs may be supported by a single virtual path. A connection between endpoint 28 and host 16 defines a virtual channel connection (VCC). Information field 36 includes an ATM protocol data stream generated by a higher-level protocol. In particular, field 36 includes a data stream of a higher level connectionless or connection-oriented protocol that is mapped into an ATM protocol backbone. Information field 36 may include voice, data, and video signal transmissions Receive data controller 19 may comprise any suitable configuration of hardware, software, or both that receives each data cell 30 from remote 14 and stores it in a selected one of queues 22 and 24 in response to the VCA associated with data cell 30 and the current capacity and content of queues 22 and 24. In one embodiment, controller 19 dynamically allocates a VCA associated with data cell 30 to a homogeneous queue 22 based upon the frequency with which controller 19 receives data cells 30 having a particular VCA. If controller 19 receives many data cells 30 sharing a common VCA, then controller 19 is more likely to allocate that VCA to a particular queue 22. Since memory 18 includes eight homogeneous queues 22, controller 19 may dynamically allocate the eight most frequently recurring VCAs to queues 22 at any particular time.

Host 16 may include any suitable organization of volatile or non-volatile memory 38 and any other peripheral components associated with a computing device, such as, for example, an input device, an output device, or an interface device. Memory 38 comprises any suitable organization of data structures 39, wherein each data structure 39 is associated with a particular VCA. In one embodiment, host 16 may comprise an endpoint 28 of network 26. Memory 38 couples to peripheral components of host 16 (not shown) using a Peripheral Component Interconnect (PCI) bus 40, or any other suitable technology that provides input/output capabilities to memory 38.

Transmit data controller 20 may comprise any suitable configuration of hardware, software, or both that transmits bursts 32, comprising individual data cells 30 sharing a common VCA, across bus 40 from queues 22 and 24 to data structures 39 associated with the VCAs. Controller 20 employs a transmission pattern that prioritizes the transmission of data cells 30 associated with the most frequently recurring VCAs over the transmission of data cells 30 associated with the least frequently recurring VCAs. In one embodiment, controller 20 alternates the transmission of data cells 30 from queues 22 and 24 to host 16 between heterogeneous queue 24 and a selected homogeneous queue 22. In particular, controller 20 transmits across bus 40 each data cell 30 stored in heterogeneous queue 24 followed by each data cell 30 stored in a first homogeneous queue 22, followed again by each data cell 30 stored in heterogeneous queue 24. Controller 20 continues this alternating transmission of data cells 30 between heterogeneous queue 24 and a successive homogeneous queue 22 until controller 20 transmits each data cell 30 stored in queues 22 and 24 across bus 40 to memory 38 of host 16.

Prior to transmitting any particular burst 32 across bus 40, controller 20 requests and acquires bandwidth associated with bus 40. In particular, controller 20 performs a handshaking process with host 16 to request and acquire available bandwidth associated with bus 40. The handshaking process may comprise a series of bus signals between controller 20 and host 16, including a request signal sent by controller 20 requesting available bandwidth on bus 40, and a grant signal issued by host 16 granting control of bus 40. Control of bus 40 entails a finite amount of bandwidth associated with an idle bus 40 granted to controller 20 with which controller 20 transmits cells 30. Bus 40 is idle when it is not currently transmitting data associated with other components of host 16. If burst 32 does not maximize the use of this allocated bandwidth, it may be allocated to another component of host 16 that may be competing for this available bandwidth.

Upon securing bandwidth on idle bus 40, controller 20 transmits burst 32 across bus 40. Burst 32 comprises an addressing signal 42 and multiple data words 44. Each addressing signal 42 identifies the data structure 39 associated with the VCA that is the destination of the next set of cells 30 for transmission across bus 40. Each data word 44 comprises a finite number of bytes of information stored in each cell 30, such as, for example, four of the possible forty-eight bytes of information stored in each cell 30. Data words 44 may include information from many cells 30 of queue 22 or one cell of queue 24.

Controller 20 controls the maximum size of burst 32 by determining the maximum number of data cells 30 that may be transmitted across bus 40 in any particular burst 32. By controlling the size of burst 32, controller 20 avoids impeding the performance of other components of host 16 that may be competing for bandwidth on bus 40 while still optimizing the use of the available bandwidth on bus 40. Controller 20 communicates addressing signal 42 to host 16 to establish the data transfer destination. Thereafter, controller 20 sequentially transmits each data word 44 into memory 38. Host 16 monitors the bus signals to determine when the last data word 44 has been transmitted by controller 20.

Dynamically allocating memory 18 to store data cells 30 associated with the most frequently recurring VCAs allows system 10 to transmit these data cells 30 across bus 40 in burst 32 rather than individually, and without requiring a significant allocation of memory 18 to support all of the potential VCAs at a particular endpoint 28. Transmitting data cells 30 across bus 40 in hburst 32 rather than individually reduces the amount of transmitted overhead information and optimizes the use of allocated bandwidth for bus 40, resulting in a faster, more efficient transmission of data cells 30 from remote 14 to host 16.

Alternating the transmission of data cells 30 between heterogeneous queue 24 and homogeneous queues 22 allows system 10 to prioritize the transmission of data cells 30 associated with the most frequently recurring VCAs over the transmission of data cells 30 associated with the least frequently recurring VCAs. In this way, system 10 services the eight most frequently recurring VCAs at any given time using an optimum amount of memory.

In operation, receive data controller 19 receives a data cell 30 from remote 14 and identifies an associated VCA by interrogating header field 34. Controller 19 interrogates each of the eight homogeneous queues 22 to determine if any queues 22 are currently allocated to the same VCA as data cell 30. If any queue 22 is currently allocated to the VCA associated with data cell 30, then controller 19 stores data cell 30 in that queue 22. If no queues 22 are so allocated, then controller 19 determines whether any queues 22 are currently unallocated. An unallocated queue 22 stores no data cells 30. If any queues 22 are unallocated, then controller 19 allocates the VCA associated with data cell 30 to tihe unallocated queue 22, and stores data cell 30 into that queue. If all queues 22 are allocated to VCAs other than the VCA associated with data cell 30, then controller 19 stores data cell 30 in heterogeneous queue 24.

In one embodiment, transmit data controller 20 includes a timing module 48 that triggers the dequeuing of data cells 30 from queues 22 and 24 of memory 18. In particular, timing module 48 monitors the occupancy of queues 22 and 24 by data cells 30. If all queues 22 and 24 are empty, then timing module 48 resets a timer to zero when controller 19 stores the next data cell 30 in any queue 22 or 24. Timing module 48 triggers the dequeuing of data cells 30 from queues 22 and 24, as described above, a programmable delay of time after the timer is reset to zero, such as, for example, from zero to ninety microseconds. Controller 20 continues dequeuing data cells 30 from queues 22 and 24 until all queues 22 and 24 are completely dequeued. Thereafter, when any of queues 22 or 24 receive a data cell 30 from controller 19, the timer is again reset to zero. Prior to transmitting any particular set of dequeued data cells 30 across bus 40 in a burst 32, controller 20 requests and acquires bandwidth associated with bus 40, as described above. Upon securing bandwidth on bus 40 and determining that bus 40 is in an idle state, controller 20 transmits bursts 32 across bus 40.

Triggering the dequeuing of data cells 30 after a programmable time delay provides a significant advantage. For example, it allows controller 20 to accumulate data cells 30 associated with any particular VCA in queues 22 and 24 for a pre-determined amount of time relating to the programmable time delay. Accumulating data cells 30 in queues 22 and 24 maximizes the use of allocated bandwidth on bus 40 by approaching the maximum number of data cells 30 that may be transmitted in burst 32.

Figure 2B:
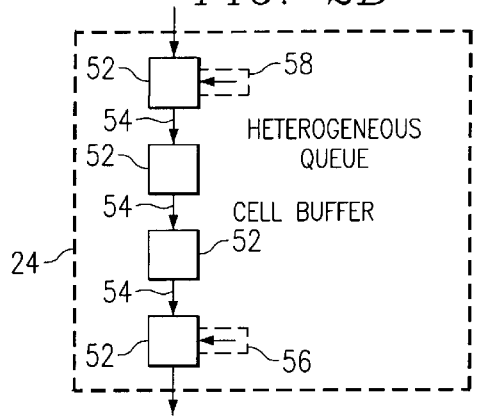
FIG. 2B illustrates one embodiment of a heterogeneous queue of the system.

FIGS. 2A and 2B illustrate one embodiment of homogeneous queues 22 and heterogeneous queues 24 of system 10, respectively. In one embodiment, queues 22 and 24 comprise a series of linked cell buffers 52. Each cell buffer 52 may comprise a sixty-four byte allocation of memory 18 of which sixteen bits is reserved for a link pointer 54 that links individual cell buffers 52 to form queues 22 and 24. Queues 22 and 24 further include a head pointer 56 and a tail pointer 58. Pointers 56 and 58 comprise an allocation of memory 18 that identifies specific data cells 30 within queues 22 and 24. In particular, head pointer 56 identifies the next data cell 30 to be dequeued from queue 22 or 24, and tail pointer 58 identifies the last data cell 30 received by queue 22 or 24.

Each homogeneous queue 22 further comprises an allocation of content addressable memory reserved for an allocation header 60. Header 60 indicates the occupancy of queue 22 by data cells 30, and any affiliation of queue 22 with a particular VCA. In particular, if queue 22 is occupied by any data cells 30, header 60 stores the VCA associated with those data cells 30. If queue 22 is unoccupied, header 60 stores a logic "0", a flag, or any other suitable indication that header 60 is unallocated. Accordingly, each buffer 52 of queue 22 stores data other than the addressing information stored in header 60. Consequently, header 60 of queues 22 provides the appropriate addressing information for addressing signal 42. Each buffer 52 of queue 24 stores data including addressing information, such as the VCA associated with a particular data cell 30. Consequently, each buffer 52 of queues 24 provides the appropriate addressing information for addressing signal 42.

Upon receiving a data cell 30, controller 19 interrogates header field 34 of data cell 30 and allocation header 60 of each homogeneous queue 22 to select a particular queue 22 or 24 in which to store data cell 30. If the VCA associated with data cell 30 matches a VCA stored in allocation header 60 of any homogeneous queue 22, then controller 19 stores data cell 30 in that queue 22. If the VCA of data cell 30 does not match the VCA stored in any of allocation headers 60, then controller 19 interrogates allocation headers 60 to determine whether any homogeneous queues 22 are currently unallocated. Upon finding an unallocated homogeneous queue 22, controller 19 stores data cell 30 in that unallocated queue 22. If all allocation headers 60 store a VCA that does not match the VCA of data cell 30, then controller 19 stores data cell 30 in heterogeneous queue 24.

Figure 3A:
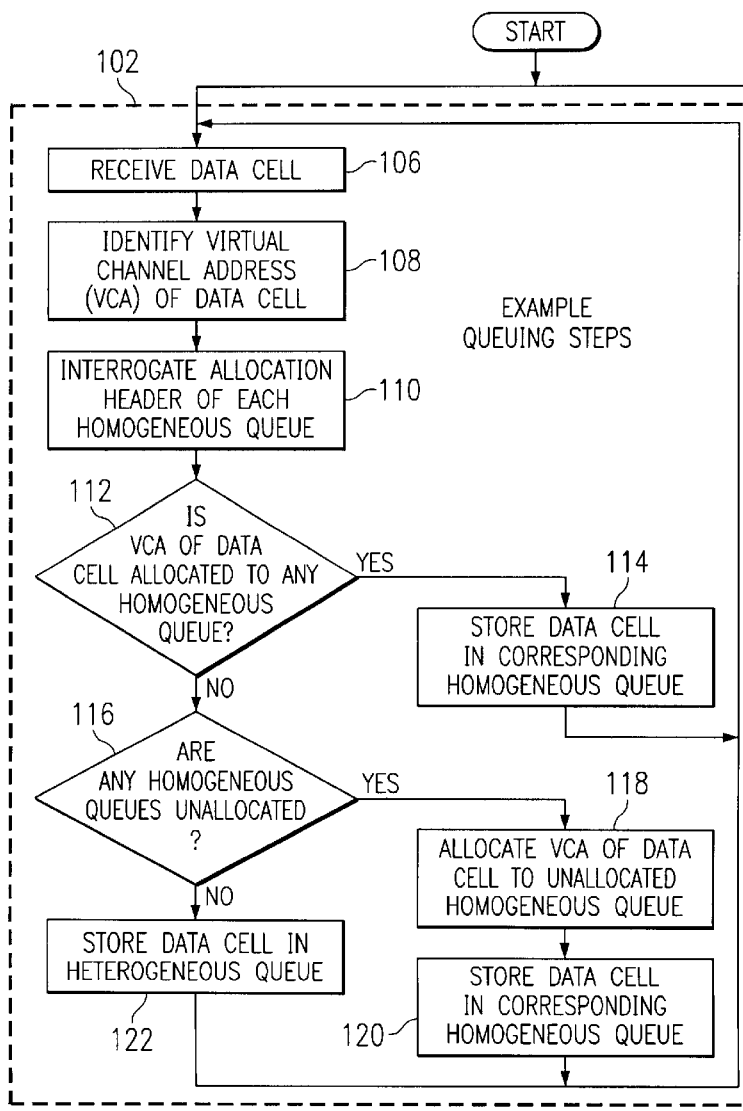
FIG. 3 illustrates a flow chart of a method for transmitting data.
Figure 3B:
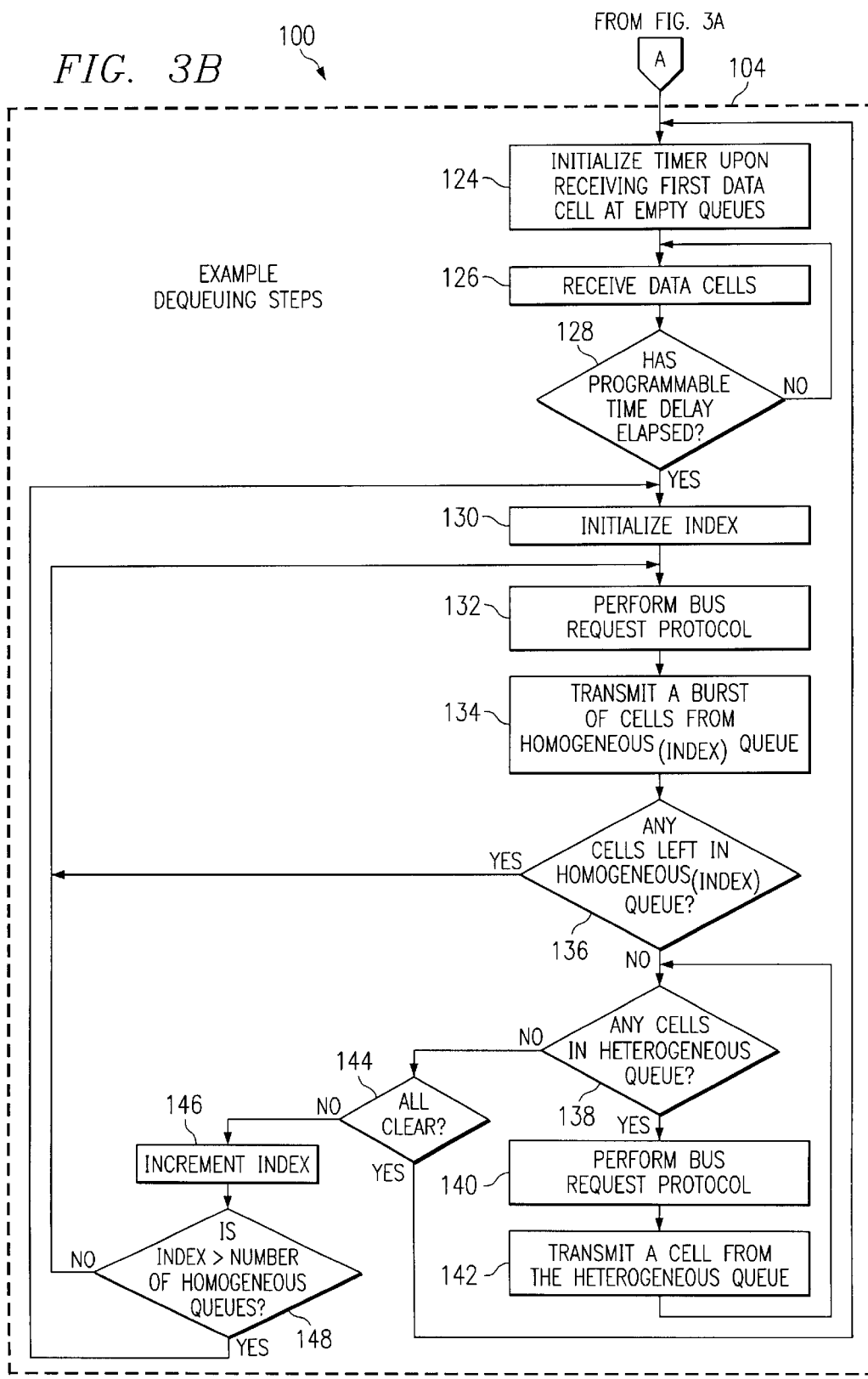

FIG. 3 illustrates a flowchart of a method for transmitting data cells 30 from remote 14 to host 16. System 10 performs queuing steps 102 and dequeuing steps 104 simultaneously. Referring to queuing steps 102, receive data controller 19 receives a data cell 30 at step 106, and identifies the VCA associated with the received data cell 30 by interrogating its header field 34, at step 108. Controller 19 interrogates allocation header 60 of each homogeneous queue 22 at step 110. Controller 19 determines whether the VCA of data cell 30 is allocated to any homogeneous queues 22 at step 112. If so, controller 19 stores data cell 30 in the corresponding homogeneous queue 22 at step 114, and execution returns to step 106. If not, execution proceeds to step 116 where controller 19 determines whether any homogeneous queues 22 are unallocated. If any homogeneous queues 22 are unallocated, controller 19 allocates the VCA of data cell 30 to allocation header 60 of the unallocated homogeneous queue 22 at step 118. Controller 19 then stores data cell 30 in the corresponding homogeneous queue 22 at step 120, and returns to step 106. If no homogeneous queues 22 are unallocated, controller 19 stores data cell 30 in heterogeneous queue 24 at step 122 and execution returns to step 106.

Referring now to the dequeuing process at steps 104, timing module 48 of transmit data controller 20 initializes a timer to zero upon receiving a first data cell 30 at unoccupied queues 22 and 24, at step 124. Queues 22 and 24 continue to receive data cells 30 at step 126 in accordance with queuing steps 102. Controller 20 determines whether a programmable time delay has elapsed at step 128. If not, execution returns to step 126 where queues 22 and 24 continue receiving data cells 30 in accordance with queuing steps 102. If so, execution proceeds to step 130, where controller 20 initializes an index to one.

Controller 20 performs the bus request handshake protocol to obtain bandwidth for transmitting burst 32 of cells 30 across bus 40 at step 132. Upon receiving a grant for the use of bus 40, controller 20 transmits addressing signal 42 and a burst 32 of data words 44 associated with one or more data cells 30 stored in homogeneous$_{(index)}$ queue 22 at step 134. For example, if the index equals one, then controller 20 transmits the burst 32 of data words 44 from cells 30 stored in homogeneous$_{(1)}$ queue 22. The size of burst 32 may be restricted by certain parameters associated with bus 40 and/or system memory 38 that govern bus latency and bandwidth allocation, memory caching, ancf bus preemption. Therefore, perhaps not all of cells 30 stored in the queue may be transmitted in a single burst 32 across bus 40. At step 136, the homogeneous$_{(index)}$ queue 22. is checked to determine if any cells 30 remain to be transmitted. If so, execution returns to step 132 to initiate the transmission of another burst 32 of data words 44 from the homogeneous $_{(index)}$ queue 22.

When no more data cells 30 remain in the homogeneous $_{(index)}$ queue 22 as determined at step 136, then execution proceeds to step 138 where the heterogeneous queue 24 is examined to determine if it contains any data cells 30. If so, controller 20 performs the bus request handshake protocol to gain use of bus 40 at step 140. When controller 20 has been granted the use of bus 40, it transmits addressing signal 42 and a burst 32 of data words 44 comprising up to one data cell 30 in the heterogeneous queue 24, at step 142. Next, heterogeneous queue 24 is again examined at step 138 to determine if any more data cells 30 remain. When the heterogeneous queue 24 is found to be empty, execution proceeds to step 144.

Controller 20 determines whether queues 22 and 24 are clear at step 144. If so, execution returns to step 124. If not, execution proceeds to step 146 where controller 20 increments the index by one. Controller 20 determines whether the index is greater than the total number of homogeneous queues 22 at step 148. For example, in the embodiment having eight homogeneous queues 22, controller 20 determines whether the index is greater than eight. If so, execution returns to step 130 where controller 20 initializes the index to one. If not, execution returns to step 132 where controller 20 again performs the bus request handshake protocol, as described above. In this way, system 10 successively services homogeneous queue$_{(1)}$, heterogeneous queue 24, homogeneous queue$_{(2)}$, heterogeneous queue 24, . . . homogeneous queue$_{(8)}$, heterogeneous queue 24, homogeneous queue$_{(1)}$, and so on.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:
1. A system for transmitting a plurality of data cells from a remote to a host, comprising:
  a plurality of homogeneous queues, each homogeneous queue operable to store data cells having a same virtual channel address;
  at least one heterogeneous queue operable to simultaneously store at least two data cells having different virtual channel addresses; and
  a controller coupled to the at least one heterogeneous queue and to the homogeneous queues, the controller operable to store a received data cell in a selected one of the queues based at least in part on a particular virtual channel address of the received data cell, the controller also operable to store the received data cell in the heterogeneous queue if each of the homogeneous queues currently stores at least one data cell having a virtual channel address different from the particular virtual channel address;
  wherein the at least one heterogeneous queue and the homogeneous queues are operable to store data cells received from a remote pending transmission of those cells over an interface to a host.

2. The system of claim 1, wherein the controller is further operable to store the received data cell in a homogeneous queue if the homogeneous queue already stores a data cell having the particular virtual channel address.

3. The system of claim 1, wherein the controller is further operable to store the received data cell in a homogeneous queue if the homogeneous queue currently stores no data cells and no other homogeneous queue currently store a data cell having the particular virtualtchannel address.

4. The system of claim 1, wherein each queue comprises:

a transmit pointer that identifies the next data cell for transmission; and a receive pointer that identifies the last data cell stored in the queue.

5. The system of claim 1, wherein the controller is further operable to facilitate alternating transmission to the host of all data cells stored in the at least one heterogeneous queue and all data cells stored in one of the plurality of homogeneous queues.

6. The system of claim 5, wherein the controller facilitates transmission of data cells of a queue across an interface bus to the host in a burst comprising an addressing signal and a plurality of data words.

7. The system of claim 5, wherein data cells are first dequeued from one of the plurality of homogeneous queues before data cells are dequeued from the at least one heterogeneous queue.

8. The system of claim 1, further comprising a timing module operable to trigger the transmission of the data cells in response to a programmable time delay.

9. The system of claim 1, wherein the homogeneous queues, the heterogeneous queue, and the controller are formed as a part of a single integrated circuit.

10. The system of claim 1, wherein each data cell comprises an ATM cell.

11. A system for transmitting a plurality of data cells from a remote to a host comprising:

a plurality of homogeneous queues, each homogeneous queue operable to store data cells having a same virtual channel address;

a heterogeneous queue operable to store at least two data cells having different virtual channel addresses;

a first controller coupled to the queues and to the remote, the first controller operable to store a received data cell in a selected one of the queues in response to a particular virtual channel address of the received data cell; and a second controller coupled to the queues and to the host, the second controller operable to transmit alternately data cells stored in the heterogeneous queue and a selected homogeneous queue.

12. The system of claim 11, wherein the first controller is further operable to store the received data cell in a homogeneous queue if the homogeneous queue currently stores a data cell having the particular virtual channel address.

13. The system of claim 11, wherein the first controller is operable to store the received data cell in a homogeneous queue if the homogeneous queue currently stores no data cells and no other homogeneous queue currently stores a data cell having the particular virtual channel address.

14. The system of claim 11, wherein the first controller is further operable to store the received data cell in the heterogeneous queue if each of the homogeneous queues currently stores at least one data cell having a virtual channel address different from the particular virtual channel address.

15. The system of claim 11, wherein each queue comprises:

a transmit pointer that identifies the next data cell for transmission; and a receive pointer that identifies the last data cell stored in the queue.

16. The system of claim 11, further comprising a timing module operable to trigger the transmission of data cells from the queues to the host in response to a programmable time delay.

17. The system of claim 11, wherein each data cell comprises an ATM cell.

18. The system of claim 11, wherein the second controller transmits data cells of a queue across an interface bus in a burst comprising an addressing signal and a plurality of data words.

19. The system of claim 11, wherein, the homogeneous queues, the heterogeneous queue, the first controller, and the second controller are formed as a part of a single integrated circuit.

20. A method of transmitting a plurality of cells over an interface to a host, the method comprising:

receiving a cell having a particular virtual channel address;

storing the received cell in a selected one of a plurality of homogeneous queues if the selected homogeneous queue currently stores another cell having the particular virtual channel address, wherein all cells stored in any particular one of the plurality of homogeneous queues share a common virtual channel address;

storing the received cell in a selected one of the plurality of homogeneous queues if the selected homogeneous queue stores no cells and if no other homogeneous queue stores a cell having the particular virtual channel address; and storing the received cell in a heterogeneous queue if each of the plurality of homogeneous queues currently stores at least one cell having a virtual channel address different from the particular virtual channel address, wherein the heterogeneous queue is operable to simultaneously store at least two cells having different virtual channel addresses.

21. The method of claim 20, wherein each queue comprises:

a transmit pointer that identifies the next data cell for transmission; and a receive pointer that identifies the last data cell stored in the queue.

22. The method of claim 20, further comprising alternating transmission of cells to a host from one of the plurality of homogeneous queues and the heterogeneous queue.

23. The method of claim 22, wherein all cells are dequeued from the one of the homogeneous queues or the heterogeneous queue before any cells are dequeued from the other of the one of the homogeneous queues and the heterogeneous queue.

24. The method of claim 22, wherein all cells are dequeued from the one of the homogeneous queues before any cells are dequeued from the heterogeneous queue.

25. The method of claim 22, wherein the heterogeneous queue comprises the only heterogeneous queue.

26. The method of claim 22, wherein transmission of cells from the queues is initiated in response to the expiration of a prograrmnable time delay.

27. The method of claim 22, wherein transmission of the cells from the queues comprises:
   acquiring available bandwidth on an interface bus that couples each queue to the host; and
   communicating a burst across the interface bus.

28. The method of claim 27, wherein the burst comprises an addressing signal and a plurality of data words.

29. The method of claim 20, wherein each cell comprises an ATM cell.

* * * * *